United States Patent
Zeffer et al.

(10) Patent No.: US 8,296,524 B2
(45) Date of Patent: Oct. 23, 2012

(54) SUPPORTING EFFICIENT SPIN-LOCKS AND OTHER TYPES OF SYNCHRONIZATION IN A CACHE-COHERENT MULTIPROCESSOR SYSTEM

(75) Inventors: Haakan E. Zeffer, Enskededalen (SE); Robert E. Cypher, Saratoga, CA (US)

(73) Assignee: Oracle America, Inc., Redwood Shores, CA (US)

( * ) Notice: Subject to any disclaimer, the term of this patent is extended or adjusted under 35 U.S.C. 154(b) by 654 days.

(21) Appl. No.: 12/492,946

(22) Filed: Jun. 26, 2009

(65) Prior Publication Data
US 2010/0332766 A1 Dec. 30, 2010

(51) Int. Cl.
*G06F 12/00* (2006.01)
*G06F 13/00* (2006.01)
*G06F 13/28* (2006.01)
(52) U.S. Cl. ......... 711/144; 711/118; 711/100; 712/203
(58) Field of Classification Search .................. 711/144, 711/100, 113, 118; 712/203
See application file for complete search history.

(56) References Cited

U.S. PATENT DOCUMENTS

| | | | | |
|---|---|---|---|---|
| 5,802,582 | A * | 9/1998 | Ekanadham et al. | 711/152 |
| 6,779,090 | B2 * | 8/2004 | McKenney et al. | 711/152 |
| 6,792,497 | B1 * | 9/2004 | Gold et al. | 710/317 |
| 7,814,488 | B1 * | 10/2010 | Dice et al. | 718/103 |
| 2004/0143712 | A1 * | 7/2004 | Armstrong et al. | 711/152 |
| 2006/0143361 | A1 * | 6/2006 | Kottapalli et al. | 711/100 |

* cited by examiner

*Primary Examiner* — Stephen Elmore
*Assistant Examiner* — Mark Giardino, Jr.
(74) *Attorney, Agent, or Firm* — Park, Vaughan, Fleming & Dowler LLP

(57) ABSTRACT

Some embodiments of the present invention provide a system that acquires a lock in a shared memory multiprocessor system. During operation, the system loads the lock into a cache associated with the thread and then reads a value of the lock. If the value indicates that the lock is currently held by another thread, the system periodically executes an instruction that tests a status of the lock. If the status indicates the lock is valid, the system continues to test the status of the lock. Otherwise, if the status indicates that the lock was invalidated by a store, the system attempts to acquire the lock by executing an atomic operation. On the other hand, if the status indicates that the lock was invalidated by an atomic operation, or that the lock is not present in the cache, the system repeats the loading and reading operations.

20 Claims, 4 Drawing Sheets

|     | T0    | T1    | T2    | T3    |
|-----|-------|-------|-------|-------|
| 102 | 1 S   | 1 S   | 1 S   | 1 S   |
| 104 | 0 M   | ? I   | ? I   | ? I   |
| 106 | 0 S   | 0 S   | ? I   | ? I   |
| 108 | 0 S   | 0 S   | 0 S   | ? I   |
| 110 | 0 S   | 0 S   | 0 S   | 0 S   |
| 112 | ? I   | 1 M   | ? I   | ? I   |
| 114 | ? I   | ? I   | 1 M   | ? I   |
| 116 | ? I   | ? I   | ? I   | 1 M   |

FIG. 1
(PRIOR ART)

|     | T0 | T1 | T2 | T3 |
| --- | --- | --- | --- | --- |
| 302 | 1  S | 1  S | 1  S | 1  S |
| 304 | 0  M | ?  $I_{ST}$ | ?  $I_{ST}$ | ?  $I_{ST}$ |
| 312 | ?  $I_A$ | 1  M | ?  $I_{ST}$ | ?  $I_{ST}$ |
| 314 | ?  $I_A$ | ?  $I_A$ | 1  M | ?  $I_{ST}$ |
| 316 | ?  $I_A$ | ?  $I_A$ | ?  $I_A$ | 1  M |

FIG. 3

SUPPORTING EFFICIENT SPIN-LOCKS AND OTHER TYPES OF SYNCHRONIZATION IN A CACHE-COHERENT MULTIPROCESSOR SYSTEM

BACKGROUND

1. Field

The present invention relates to techniques for improving multiprocessor performance. More specifically, the present invention relates to a technique for implementing an efficient spin-lock in a shared memory multiprocessor system.

2. Related Art

A spin-lock is commonly used to synchronize actions between multiple threads in a computer system. When a given thread attempts to acquire a spin-lock and detects that the spin-lock is held by another thread, the given thread repeatedly attempts to acquire the lock, or repeatedly checks the status of the lock and then attempts to acquire the lock when the status indicates the lock is free.

Spin-locks are commonly used because they are simple to implement and because they have good performance for lightly contested locks. However, spin-locks can suffer from high hand-over latency, which occurs when a spin-lock is contested. More specifically, the hand-over latency is the time from when the current lock owner frees the lock to when the next owner acquires the lock. Additionally, contested spin-locks can cause a significant amount of coherence traffic in cache-coherent, shared memory multiprocessor systems.

Hence, what is needed is a method and an apparatus for implementing spin-locks without the associated hand-over latency and coherence traffic.

SUMMARY

Some embodiments of the present invention provide a system that acquires a lock in a shared memory multiprocessor system. During operation, the system loads the lock into a cache associated with the thread and then reads a value of the lock. If the value indicates that the lock is currently held by another thread, the system periodically executes an instruction that tests a status of the lock. If the status indicates the lock is valid, the system continues to test the status of the lock. Otherwise, if the status indicates that the lock was invalidated by a store, the system attempts to acquire the lock by executing an atomic operation. On the other hand, if the status indicates that the lock was invalidated by an atomic operation, or that the lock is not present in the cache, the system repeats the loading and reading operations.

In some embodiments, attempting to acquire the lock involves performing a test-and-set operation on the lock.

In some embodiments, if the attempt to acquire the lock fails, the system repeats the loading and reading operations.

In some embodiments, if the attempt to acquire the lock succeeds, the system uses a coherence protocol to invalidate copies of the lock located in other caches, so that status information for the invalidated copies indicates the invalidations were caused by the atomic operation. Next, the system executes a critical section associated with the lock, and after the critical section is executed, releases the lock.

In some embodiments, releasing the lock involves storing a value to the lock, which causes a coherence protocol to invalidate copies of the lock located in other caches, so that status information for the invalidated copies indicates the invalidations were caused by a store.

In some embodiments, prior to loading and reading the lock, the system initially attempts to acquire the lock. If the initial attempt fails, the system performs the loading and reading operations.

In some embodiments, the lock is located in a cache line, and loading the lock involves loading the cache line.

In some embodiments, the instruction that tests the status of the lock additionally updates state information for the cache line to indicate that the cache line was recently used, so that the cache line is less likely to be replaced during subsequent cache accesses.

In some embodiments, the instruction that tests the status of the lock operates by reading status information for the lock from either a cache line associated with the lock, or a per-thread structure associated with the thread.

In some embodiments, the lock is loaded into a shared cache, and the process of loading the lock involves executing a "load-track primitive" which initiates tracking of updates to the lock. Next, if the tracking indicates that the lock has been updated but not invalidated, the system attempts to acquire the lock by executing the atomic operation.

BRIEF DESCRIPTION OF THE FIGURES

FIG. 1 illustrates how copies of a spin-lock associated with different threads are updated.

FIG. 3 illustrates how copies of a spin-lock associated with different threads are updated in accordance with an embodiment of the present invention.

DETAILED DESCRIPTION

Figure 2:
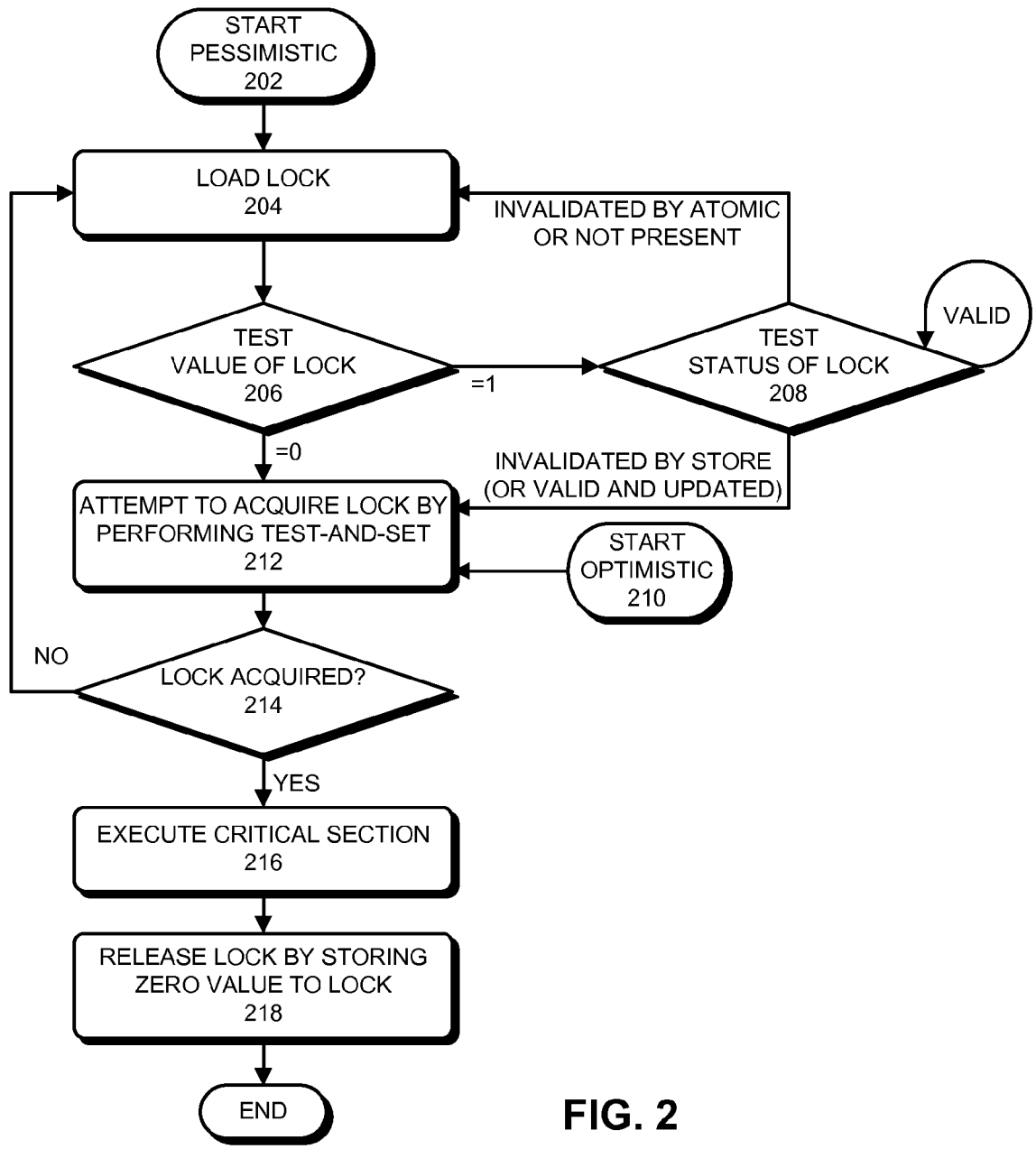
FIG. 2 presents a flow chart illustrating how a spin-lock is acquired in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Pessimistic and Optimistic Spin-Locks

The present invention is related to two well-known spin-locks, namely the test-and-test-and-set ("pessimistic") lock and the test-and-set-and-test-and-test-and-set ("optimistic") lock. For the pessimistic lock, the thread repeatedly tests the status of the lock with load instructions, and once the lock is detected to be free, the thread attempts to acquire the lock with a test-and-set primitive. If it fails, it repeats the above loop. In contrast, for the optimistic lock, the thread first tries to acquire the lock with a test-and-set primitive, and if it fails, it then uses the above pessimistic protocol to acquire the lock.

Both of these protocols suffer from high hand-over latency. In particular, when the current lock owner frees the lock (by using a standard store instruction), the spinning threads' copies of the lock are invalidated, and each of these threads subsequently performs a load to obtain a readable copy of the lock which misses in the cache. These cache misses cause coherence traffic. Next, the threads detect that the lock is free, and they each perform a test-and-set atomic operation (which causes additional coherence traffic) to obtain a writeable copy of the lock.

More specifically, FIG. 1 illustrates copies of a specific lock, which are held by threads T0, T1, T2 and T3 and which are modified using an MSI cache-coherence protocol. Each column in FIG. 1 represents a sequence of states for a thread-specific copy of the specific lock. In particular, the copy associated with T0 appears in the column below the label T0, the copy associated with T1 appears in the column below the label T1, the copy associated with T2 appears in the column below the label T2, and the copy associated with T3 appears in the column below the label T3. Moreover, each row in FIG. 1 illustrates a specific state of the system, and the next row down illustrates a subsequent state.

The lock acquisition process generally operates as follows. In state 102, assume that T0 has possession of the lock and the other threads T1, T2 and T3 are spinning on the lock. Note that the value "1" in each copy of the lock indicates that the lock is held (by one of the threads), and the state "S" in each copy of the lock indicates that each copy is a shared copy of the lock.

Next, in state 104, T0 frees the lock by storing a zero value to the lock. This store operation cause a zero value to be written to T0's copy of the lock, and the coherence protocol causes the copy to be in the modified (M) state. As part of the store operation, the other copies of the lock, which are held by threads T1, T2 and T3, are invalidated by the coherence protocol.

Next, each of the other threads T1, T2 and T3 performs a load to obtain a readable copy of the lock. More specifically, in state 106, T1 performs a load, which causes T1's copy of the lock to have a zero value and to be in the shared state, and also causes T0's copy of the lock to become shared. Then, in state 108, T2 reads the lock, which causes T2's copy to have a zero value and to be in the shared state. Finally, in state 110, T3 reads the lock, which causes T3's copy to have a zero value and to be in the shared state.

Next, in state 112, T1 successfully acquires the lock by performing an atomic operation, such as test-and-set, on the lock. This causes a one value and an M state to be written to T1's copy of the lock. Also, during the atomic operation, the other copies of the lock which are held by threads T0, T2 and T3 are invalidated by the coherence protocol.

Then, in state 114, T2 unsuccessfully attempts to acquire the lock by performing an atomic operation on the lock. This causes a one value and an M state to be written to T2's copy of the lock. Also, during the atomic operation, the copy of the lock which is held by T1 is invalidated by the coherence protocol.

Similarly, in state 116, T3 unsuccessfully attempts to acquire the lock by performing an atomic operation on the lock. This causes a one value and an M state to be written to T3's copy of the lock. Also, during the atomic operation, the copy of the lock which is held by T2 is invalidated by the coherence protocol.

Next, the threads go back to spinning load operations on their respective copies of the lock, because they failed to acquire the lock during their respective test-and-set operations. This causes a one value and an S to be written to each thread's copy of the lock, which returns the system to state 102, except that T1 (instead of T0) now holds the lock.

As mentioned above, the present invention eliminates much of the hand-over latency and the coherence bandwidth involved in performing the above-described operations. In doing so, the present invention makes use of a number of hardware primitives, which are described below.

Hardware Primitives

A number of hardware primitives make these performance improvements possible. More specifically, one embodiment of the system provides (1) an instruction that tests the status of a lock (which is located in a cache line in an L1 cache). This status information indicates whether the lock is (a) valid, (b) invalidated by a store, (c) invalidated by an atomic operation, or (d) not present in the L1 cache.

The system additionally provides (2) support in the coherence protocol to differentiate between coherence requests for stores versus coherence requests for atomic operations. This can involve adding more states to a coherence packet or adding coherence signals to differentiate between the two types of coherence requests.

The system additionally provides support in the L1 cache (or in a separate per-thread structure) to record if a cache line was invalidated by a store coherence request versus an atomic coherence request. Note that existing coherence state information simply has to be augmented to include two types of invalid states, one which indicates that the cache line was invalidated by a store, and one which indicates that the cache line was invalidated by an atomic operation.

Pessimistic Spin-Lock

The primitives described above can be used to implement an efficient pessimistic lock as follows. Referring to FIG. 2, for the pessimistic test-and-test-and-set lock (which starts at step 202), the thread which is attempting to acquire the lock first tests the lock. This involves using a load instruction to load the lock (step 204) and then testing the value of the lock (step 206).

Next, if the value of the lock equals zero, which indicates the lock is free, the thread attempts to acquire the lock by performing a test-and-set atomic operation on the lock (step 212).

On the other hand, if the value of the lock is one, indicating that the lock is held by another thread, the current thread "spins" by testing the status of the lock's cache line using the special status-testing instruction described above (step 208). If the test returns "valid," the thread loops back to step 208 to test the status of the lock again. On the other hand, if the test indicates that the lock is "invalidated by atomic" or "not present," the thread returns to step 204 to start over. Additionally, if the test returns "invalidated by a store," the thread attempts to acquire the lock by executing a test-and-set atomic operation (step 212).

After executing the test-and-set operation, the thread determines from the value returned by the test-and set operation whether the lock was successfully acquired (step 214). If not, the thread returns to step 204 to start over. On the other hand, if the lock was successfully acquired, the thread executes the critical section associated with the lock (step 216). Note that a critical section can generally include any piece of code that accesses a shared resource (such as a data structure or device) that must not be concurrently accessed by more than one thread. Synchronization mechanisms, such as spin-locks, can be used to guarantee that at most one thread can access a critical section at any given time. More specifically, a thread is typically required to hold a lock before the thread can access a critical section, and the thread will release the lock after the thread completes the critical section. Hence, in the present example, after the thread completes the critical section, the thread releases the lock by using a standard store instruction to store a zero value to the lock (step 218). At this point, the process is complete.

Optimistic Spin-Lock

For the optimistic test-and-set-and-test-and-test-and-set lock, the system uses the same flow chart as the pessimistic lock, except that the optimistic lock starts at step 210 and proceeds to step 212, where the thread attempts to acquire the lock by performing an atomic test-and set operation. Next, the thread determines from the value returned by the test-and-set operation whether the lock was successfully acquired (step 214). If so, the thread executes the critical section associated with the lock (step 216) and releases the lock by using a standard store instruction to store a zero value to the lock (step 218). Otherwise, if the thread determines the lock was not successfully acquired, the thread returns to step 204 to start over.

Example

Note that the above-described spin-locks are more efficient than the corresponding traditional spin-locks because when a lock is freed with a store instruction, the spinning threads attempt to acquire the lock immediately using an atomic test-and-set operation, rather than by first performing a load which generates additional cache coherence traffic. For example, FIG. 3 illustrates how copies of a spin-lock, which are associated with different threads, are updated in accordance with an embodiment of the present invention. This example is the same as the example illustrated in FIG. 1, except that the new primitives are used to reduce hand-over latency and coherence traffic.

The lock-acquisition process operates as follows. In state 302, T0 has possession of the lock and the other threads T1, T2 and T3 have loaded copies of the lock into their respective L1 caches and are spinning on the lock (step 208 in FIG. 2). Note that the value "1" in each copy of the lock indicates that the lock is held (by one of the threads), and the state "S" in each copy of the lock indicates that the copy is a shared copy of the lock.

Next, in state 304, T0 frees the lock by storing a zero value to the lock. This store causes a zero value to be written to T0's copy of the lock and causes the copy to be in the modified (M) state. As part of the store operation, the other copies of the lock (which are held by threads T1, T2 and T3) are invalidated by the coherence protocol. During this invalidation process, the status information for each of these copies of the lock is updated to indicate that the copies were invalidated by a store operation $I_{ST}$.

Note that unlike the example illustrated in FIG. 1, the copies of the lock do not have to be loaded again to determine that the lock has been freed. (This can be determined by executing the special instruction described above which tests the status of the lock without having to load the lock again.) Hence, the overhead involved in states 106, 108 and 110 in FIG. 1 is avoided.

Next, in state 312, T1 successfully acquires the lock by performing an atomic operation, such as test-and-set, on the lock. This causes a one value and an M state to be written to T1's copy of the lock. Also, during the atomic operation, the other copy of the lock which was held by thread T0 is invalidated by the coherence protocol, and the status information for T0's copy of the lock is updated to indicate that the copy was invalidated by an atomic operation $I_A$.

Next, in state 314, T2 unsuccessfully attempts to acquire the lock by performing an atomic operation on the lock. This causes a one value and an M state to be written to T2's copy of the lock. Also, during the atomic operation, the copy of the lock which is held by T1 is invalidated by the coherence protocol. During this invalidation process, the status information for T1's copy of the lock is updated to indicate that the copy was invalidated by an atomic operation $I_A$.

Similarly, in state 316, T3 unsuccessfully attempts to acquire the lock by performing an atomic operation on the lock. This causes a one value and an M state to be written to T3's copy of the lock. Also, during the atomic operation, T2's copy of the lock is invalidated by the coherence protocol, and the status information for T2's copy of the lock is updated to indicate that the copy was invalidated by an atomic operation $I_A$.

Next, when each thread's copy of the lock is invalidated by an atomic operation, the thread returns to step 204 in FIG. 2 to load its copy of the lock again, which causes a one value and an S to be written to each thread's copy of the lock. This returns the system to state 302, except that T1 (instead of T0) now holds a copy of the lock.

As mentioned above, this new protocol avoids the significant overhead involved in performing states 106, 108 and 110 which are illustrated in FIG. 1.

Load-Track Primitive

The new protocol described above can be modified to handle shared L1 caches. In particular, the load instruction in step 204 can be replaced by a load-track primitive (which starts tracking of the status of the associated cache line). The spin-lock implementations are then identical to the efficient protocols described above, except that if the test instruction returns "updated" at step 208 in FIG. 2, the thread proceeds to step 212 to perform a test-and-set atomic (just as in the case where the test returns "invalidated by a store").

LRU Updating

The present invention can also include support for updating the least-recently-used (LRU) or pseudo-least-recently-used (pseudo-LRU) state information for the cache line when using the special instruction to test the status of the lock in step 208 of FIG. 2. This makes it less likely that the cache line containing the lock will be evicted from the L1 cache while a thread is using the special instruction to test the status of the lock.

Generalization to Other Types of Synchronization

Although the embodiments of the present invention described above illustrate how the present invention can be used to improve the performance of a spin-lock, the present invention can also be applied to other types of synchronization. In general, the present invention can be applied to any synchronization technique in which a thread spins waiting for a value to be updated, and if the invalidation that caused the value to be updated in the desired manner can be detected with an instruction which tests the status of the value. Examples of such other synchronization techniques include the "queue locks" described in: (1) P. Magnussen, A. Landin, and E. Hagersten, "Queue locks on cache coherent multiprocessors," in Proc. of the Eighth International Symposium on Parallel Processing (IPPS), pp. 165-171, April 1994, IEEE Computer Society; and (2) J. Mellor-Crummey and M. L. Scott, "Algorithms for scalable synchronization on shared-memory multiprocessors," ACM Transactions on Computer Systems, 9(1):21-65, 1991.

Existing Architectures

Note that existing architectures (such as the PowerPC) support load-linked and store-conditional instructions (where the "load-linked" instruction is sometimes called a "load-locked" instruction). The load-linked instruction returns the value and starts tracking the status of the cache line, such that a subsequent store-conditional instruction will succeed (and perform the store) only if the cache line being tracked has not been invalidated or updated. The present invention differs from these architectures because it includes support for differentiating types of invalidations and it introduces a new test instruction that tests the status of the cache line without possibly storing to the cache line, and without generating coherence traffic. As a result, these existing architectures cannot support the efficient spin-locks described above.

Computer System

Figure 4:
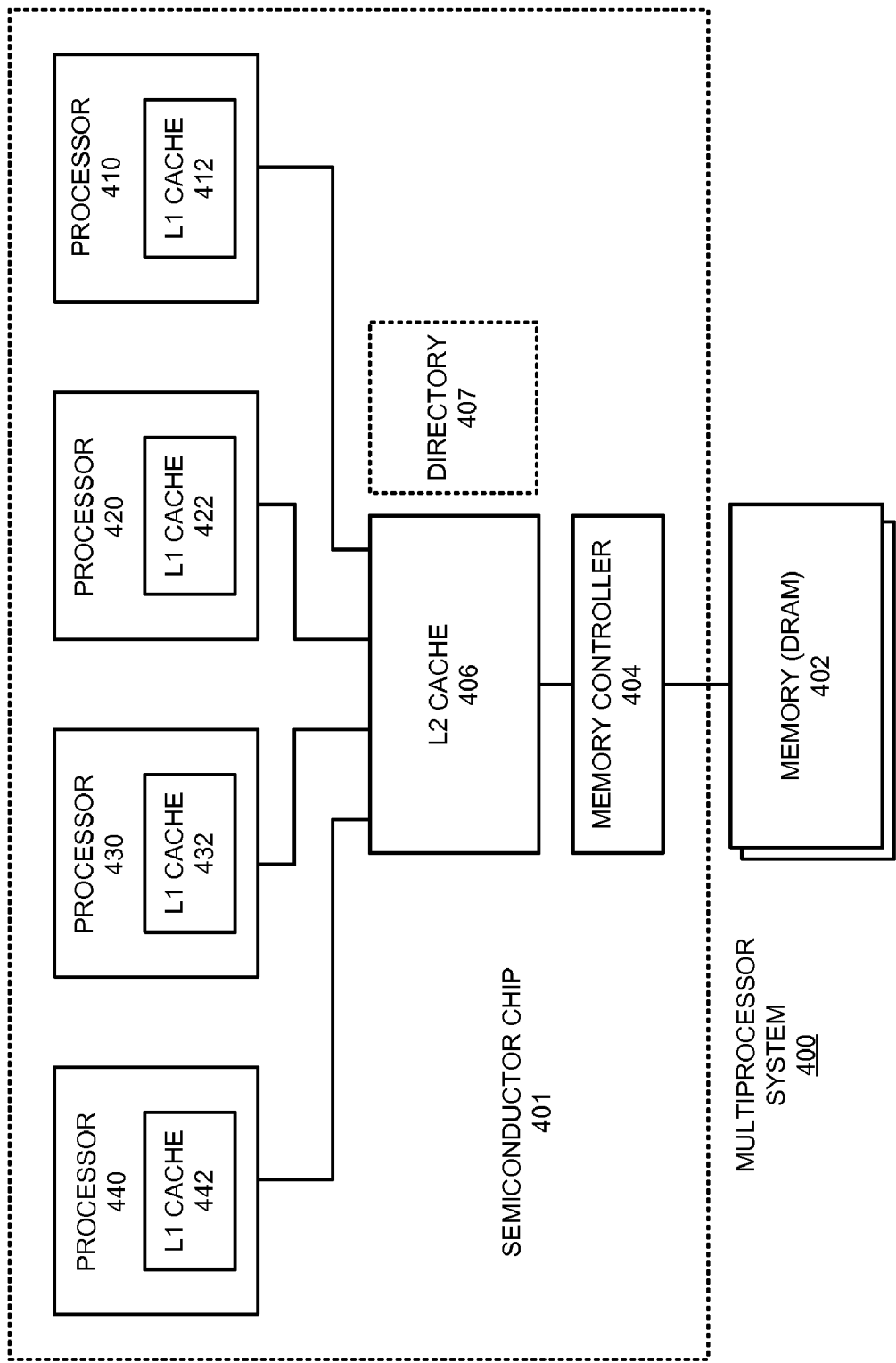
FIG. 4 illustrates a computer system in accordance with an embodiment of the present invention.

FIG. 4 illustrates an exemplary multiprocessor system 400 in accordance with an embodiment of the present invention. Note that a significant portion of multiprocessor system 400 is located within a single semiconductor chip 401. More specifically, semiconductor chip 401 includes processors 410, 420, 430 and 440, which contain level one (L1) caches 412, 422, 432 and 442, respectively. L1 caches 412, 422, 432 and 442 may be separate instruction and data caches, or alternatively, unified instruction/data caches.

L1 caches 412, 422, 432 and 442 are coupled to level two (L2) cache 406, which includes a directory 407, wherein directory 407 contains information about where copies of specific cache lines are located in L1 caches 412, 422, 432 and 442. L2 cache 406 is additionally coupled to off-chip memory 402 through memory controller 404.

In one embodiment of the present invention, L1 caches 412, 422, 432 and 442 are write-through caches. This means that all updates to L1 caches 412, 422, 432 and 442 are automatically propagated to L2 cache 406. This simplifies the coherence protocol, because if processor 410 requires a data item that is present in L1 cache 412, processor 410 can receive the data from L2 cache 406 without having to wait for L1 cache 412 to source the data.

Note that multiprocessor system 400 additionally includes the hardware primitives described above. More specifically, multiprocessor system 400 includes: (1) an instruction that tests the status of a lock; (2) a coherence protocol that differentiates between coherence requests for stores versus coherence requests for atomic operations; and (3) support in the L1 caches (or a separate per-thread structure) to record if a cache line was invalidated by a store coherence request versus an atomic coherence request. Multiprocessor system 400 can also include the above-described load-track primitive and support for updating the LRU state information when the special status-checking instruction is used.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for acquiring a lock for a thread in a shared memory multiprocessor system, comprising:
    loading the lock into a cache associated with the thread;
    reading a value of the lock; and
    if the value indicates that the lock is currently held by another thread, periodically executing an instruction that tests a status of the lock, wherein
        if the status indicates that the lock is valid, continuing to test the status of the lock;
        if the status indicates that the lock was invalidated by a store, attempting the acquire the lock by executing an atomic operation; and
        if the status indicates that the lock was invalidated by an atomic operation, or that the lock is not present in the cache, repeating the loading and reading operations.

2. The method of claim 1, wherein attempting to acquire the lock involves performing a test-and-set operation on the lock.

3. The method of claim 1, wherein if the attempt to acquire the lock fails, the method further comprises repeating the loading and reading operations.

4. The method of claim 1, wherein if the attempt to acquire the lock succeeds, the method further comprises:
    causing a coherence protocol to invalidate copies of the lock located in other caches, so that status information for the invalidated copies indicates the invalidations were caused by the atomic operation;
    executing a critical section associated with the lock; and
    after the critical section is executed, releasing the lock.

5. The method of claim 4,
    wherein releasing the lock involves storing a value to the lock; and
    wherein storing the value to the lock causes a coherence protocol to invalidate copies of the lock located in other caches, so that status information for the invalidated copies indicates the invalidations were caused by a store.

6. The method of claim 1, wherein prior to loading and reading the lock, the method further comprises initially attempting to acquire the lock, and if the initial attempt fails, performing the loading and reading operations.

7. The method of claim 1,
    wherein the lock is located in a cache line; and
    wherein loading the lock involves loading the cache line.

8. The method of claim 7, wherein the instruction that tests the status of the lock additionally updates state information for the cache line to indicate that the cache line was recently used, so that the cache line is less likely to be replaced during subsequent cache accesses.

9. The method of claim 1, wherein the instruction that tests the status of the lock operates by reading status information for the lock from:
    a cache line associated with the lock; or
    a per-thread structure associated with the thread.

10. The method of claim 1,
    wherein the lock is loaded into a shared cache;
    wherein loading the lock involves executing a load-track primitive which initiates tracking of updates to the lock; and wherein if the tracking indicates that the lock has been updated but not invalidated, the method further comprises attempting to acquire the lock by executing the atomic operation.

11. A system that facilitates acquiring a lock for a thread, comprising:
   a multiprocessor comprising a plurality of processors;
   a lock-acquiring mechanism in a processor in the plurality of processors, wherein the lock-acquiring mechanism is configured to perform an atomic operation to acquire the lock; and
   a lock-testing mechanism in the processor, wherein the lock-testing mechanism is configured to load the lock into a cache associated with the thread, and read a value of the lock; and
   wherein if the value indicates that the lock is currently held by another thread, the lock-testing mechanism is configured to periodically execute an instruction that tests a status of the lock;
   wherein if the status indicates that the lock is valid, the lock-testing mechanism is configured to continue to test the status of the lock;
   wherein if the status indicates that the lock was invalidated by an atomic operation, or that the lock is not present in the cache, the lock-testing mechanism is configured to repeat the loading and reading operations; and
   wherein if the status indicates that the lock was invalidated by a store, the lock-acquiring mechanism is configured to attempt to acquire the lock by executing the atomic operation.

12. The system of claim 11, wherein the lock-acquiring mechanism is configured to perform a test-and-set operation on the lock.

13. The system of claim 11, wherein if the attempt to acquire the lock fails, the lock-testing mechanism is configured to repeat the loading and reading operations.

14. The system of claim 11,
   wherein if the attempt to acquire the lock succeeds, the processor is configured to,
      cause a coherence protocol to invalidate copies of the lock located in other caches, so that status information for the invalidated copies indicates the invalidations were caused by the atomic operation, and
      execute a critical section associated with the lock; and
   wherein the processor further comprises a lock-releasing mechanism, wherein after the critical section is executed, the lock-releasing mechanism is configured to release the lock.

15. The system of claim 14,
   wherein the lock-releasing mechanism is configured to release the lock by storing a value to the lock; and
   wherein storing the value to the lock causes a coherence protocol to invalidate copies of the lock located in other caches, so that status information for the invalidated copies indicates the invalidations were caused by a store.

16. The system of claim 11,
   wherein prior to loading and reading the lock, the lock-acquiring mechanism is configured initially to attempt to acquire the lock; and
   wherein if the initial attempt fails, the lock-testing mechanism is configured to perform the loading and reading operations.

17. The system of claim 11,
   wherein the lock is located in a cache line; and
   wherein loading the lock involves loading the cache line.

18. The system of claim 17, wherein the instruction that tests the status of the lock additionally updates state information for the cache line to indicate that the cache line was recently used, so that the cache line is less likely to be replaced during subsequent cache accesses.

19. The system of claim 11,
   wherein the lock is loaded into a shared cache;
   wherein loading the lock involves executing a load-track primitive which initiates tracking of updates to the lock; and
   wherein if the tracking indicates that the lock has been updated but not invalidated, the system further comprises attempting to acquire the lock by executing the atomic operation.

20. A multiprocessor system that facilitates acquiring a lock for a thread, comprising:
   a plurality of processors;
   wherein a processor in the plurality of processors provides a lock-acquiring instruction which is configured to perform an atomic operation to acquire the lock;
   wherein the processor also provides a lock-testing instruction, which is configured to load the lock into a cache associated with the thread, and read a value of the lock;
   wherein if the value indicates that the lock is currently held by another thread, the lock-testing instruction is configured to periodically execute an instruction that tests a status of the lock;
   wherein if the status indicates that the lock is valid, the lock-testing instruction is configured to continue testing the status of the lock;
   wherein if the status indicates that the lock was invalidated by an atomic operation, or that the lock is not present in the cache, the lock-testing instruction is configured to repeat the loading and reading operations; and
   wherein if the status indicates that the lock was invalidated by a store, the processor is configured to execute the lock-acquiring instruction to attempt to acquire the lock.

* * * * *